(12) United States Patent
Nowak et al.

(10) Patent No.: US 10,072,160 B1
(45) Date of Patent: *Sep. 11, 2018

(54) HIGH-DURABILITY ANTI-FOULING AND ANTI-ICING COATINGS

(71) Applicant: HRL Laboratories, LLC, Malibu, CA (US)

(72) Inventors: Andrew P. Nowak, Los Angeles, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/829,642

(22) Filed: Aug. 19, 2015

Related U.S. Application Data (60) Provisional application No. 62/038,893, filed on Aug. 19, 2014.

(51) Int. Cl.
*C09D 5/16* (2006.01)
*C09D 163/00* (2006.01)
(Continued)

(52) U.S. Cl.
CPC .......... *C09D 5/16* (2013.01); *C08G 18/4607* (2013.01); *C08G 18/5015* (2013.01);
(Continued)

(58) Field of Classification Search
CPC ............. C09K 3/18; C08L 63/00–63/10; C08L 75/04; C09D 163/00–163/10;
(Continued)

(56) References Cited

U.S. PATENT DOCUMENTS 3,810,874 A 5/1974 Mitsch et al.
3,847,978 A 11/1974 Sianesi et al.
(Continued)

FOREIGN PATENT DOCUMENTS

CN 103483894 A * 1/2014
WO WO 2014067715 A1 * 5/2014 .......... B41M 7/0045

OTHER PUBLICATIONS

Diversified Enterprises, Surface Energy Data for Polytetrafluoroethylene (PTFE), obtained at http://www.accudynetest.com/polymer_surface_data/ptfe.pdf (retrieved Mar. 31, 2017).*
(Continued)

*Primary Examiner* — Kregg T Brooks
(74) *Attorney, Agent, or Firm* — O'Connor & Company (57) ABSTRACT

The invention provides a highly durable surface coating intended to inhibit the formation of ice at sub-0° C. temperatures as well as reduce the accumulation of dirt and insect debris to a vehicle surface upon impact. A continuous, durable matrix surrounds both low-surface-energy (low-adhesion) material inclusions as well as hygroscopic material inclusions. Some variations provide a low-friction, low-adhesion material comprising: a durable continuous matrix; a plurality of first inclusions, dispersed within the matrix, each comprising a low-surface-energy polymer; and a plurality of second inclusions, dispersed within the matrix, each comprising a hygroscopic material. The matrix and the first and second inclusions form a lubricating surface layer in the presence of humidity. Other variations employ a durable continuous matrix and a plurality of inclusions, dispersed within the matrix, each comprising a low-surface-energy polymer surrounding a hygroscopic material. Coating precursors and methods of forming final coatings are also described.

31 Claims, 3 Drawing Sheets

(51) Int. Cl.
*C09D 175/00* (2006.01)
*C09K 3/18* (2006.01)
*C08G 18/46* (2006.01)
*C08G 18/50* (2006.01)
*C08G 18/62* (2006.01)
*C08G 77/24* (2006.01)
*C08G 77/385* (2006.01)
*C09D 175/04* (2006.01)

(52) U.S. Cl.
CPC ......... *C08G 18/6279* (2013.01); *C08G 77/24* (2013.01); *C08G 77/385* (2013.01); *C09D 163/00* (2013.01); *C09D 175/04* (2013.01); *C09K 3/18* (2013.01)

(58) Field of Classification Search
CPC ............... C09D 175/04; C09D 5/16; C09J 163/00–163/10; C09J 175/04; C08G 77/24; C08G 77/385; C08G 18/4607; C08G 18/505; C08G 18/6279
See application file for complete search history.

(56) References Cited

U.S. PATENT DOCUMENTS

| | | | |
|---|---|---|---|
| 4,935,480 A | 6/1990 | Zdrahala et al. | |
| 5,026,814 A | 6/1991 | Re et al. | |
| 5,032,666 A | 7/1991 | Hu et al. | |
| 5,084,315 A | 1/1992 | Karimi et al. | |
| 5,189,135 A | 2/1993 | Cozzi et al. | |
| 5,332,798 A | 7/1994 | Ferreri et al. | |
| 6,160,040 A * | 12/2000 | Ghosh .................. | C08G 59/182 523/404 |
| 6,926,937 B2 | 8/2005 | Extrand et al. | |
| 7,956,124 B2 | 6/2011 | Peng et al. | |
| 2004/0019143 A1 | 1/2004 | Koloski et al. | |
| 2011/0027642 A1* | 2/2011 | Lee .................... | B01D 67/0079 429/145 |
| 2014/0303284 A1* | 10/2014 | Chavan .................. | C08L 63/00 523/435 |
| 2016/0201005 A1* | 7/2016 | Nowak ................ | C08G 81/025 508/552 |
| 2017/0015922 A1* | 1/2017 | Gross .................. | C10M 107/38 |

OTHER PUBLICATIONS

English language abstract of CN 103483894 A.*
Ashish Vaidya and Manoj K. Chaudhury, "Synthesis and Surface Properties of Environmentally Responsive Segmented Polyurethanes," Journal of Colloid and Interface Science 249,235-245 (2002).
Siochi et al., "Engineered Surfaces for Mitigation of Insect Residue Adhesion" NF1676L-15481 SAMPE 2013; May 6-9, 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Lohse et al., "Microphase Separation in Block Copolymers," Current Opinion in Colloid & Interface Science 1997, 2:171-176.

* cited by examiner

HIGH-DURABILITY ANTI-FOULING AND ANTI-ICING COATINGS

PRIORITY DATA

This patent application is a non-provisional application claiming priority to U.S. Provisional Patent App. No. 62/038,893, filed on Aug. 19, 2014, which is hereby incorporated by reference herein.

FIELD OF THE INVENTION

The present invention generally relates to low-friction and low-adhesion materials, coatings, and systems.

BACKGROUND OF THE INVENTION

Coatings and materials can become soiled from debris (particles, insects, oils, etc.) impacting the surface. The debris affects airflow over the surface as well as aesthetics and normally is removed by washing. Coatings also can accumulate ice under certain environmental conditions.

Many attempts are described to mitigate insect accumulation during the early days of aircraft development. These include mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

Recently, Wohl et al., "Evaluation of commercially available materials to mitigate insect residue adhesion on wing leading edge surfaces," *Progress in Organic Coatings* 76 (2013) 42-50 describe work at NASA to create anti-insect adhesion or "bugphobic" surfaces. Wohl et al. tested the effect of organic-based coatings on insect adhesion to surfaces, but the coatings did not fully mitigate the issue. Wohl et al. also describe previously used approaches to reduce bug adhesion such as mechanical scrapers, deflectors, paper and/or other coverings, elastic surfaces, soluble films, and washing the surface continually with fluid.

One approach to this problem is to create a self-cleaning surface that removes debris from itself by controlling chemical interactions between the debris and the surface.

Superhydrophobic and superoleophobic surfaces create very high contact angles (>150°) between the surface and drops of water and oil, respectively. The high contact angles result in the drops rolling off the surface rather than remaining on the surface. These surfaces do not repel solid foreign matter or vapors of contaminants. Once soiled by impact, debris will remain on the surface and render it ineffective. Also, these surfaces lose function if the nanostructured top surface is scratched.

Fluoropolymer sheets or treated surfaces have low surface energies and thus low adhesion force between foreign matter and the surface. However, friction between impacting debris and the surface results in the sticking of contaminants.

Fluorofluid-filled surfaces have very low adhesion between impacting debris and the surface. However, if any of the fluid is lost, the surface cannot be refilled/renewed once applied on the vehicle, and thus loses its properties (see Wong et al., "Bioinspired self-repairing slippery surfaces with pressure-stable omniphobicity," *Nature* 477, 443-447, 2011).

Enzyme-filled coatings leech out enzymes that dissolve debris on the surface. However, the enzymes are quickly depleted and cannot be refilled, rendering this approach impractical.

Kok et al., "Influence of surface characteristics on insect residue adhesion to aircraft leading edge surfaces," *Progress in Organic Coatings* 76 (2013) 1567-1575, describe various polymer, sol-gel, and superhydrophobic coatings tested for reduced insect adhesion after impact. The best-performing materials were high-roughness, superhydrophobic surfaces. However, they did not show that debris could be removed from the superhydrophobic surfaces once insects broke on the surface.

Ice accumulation can be mitigated by active systems that redirect hot engine bleed air to a given location or mechanical bladders that can actuate to expand and break ice free from a wing surface. Superhydrophobic surfaces have been attempted for the reduction of ice accumulation on surfaces. However, it has been shown that superhydrophobic properties do not equate to icephobic properties (see Chen et al., "Superhydrophobic surfaces cannot reduce ice adhesion," *Appl. Phys. Lett.* 101, 111603, 2012).

In view of the shortcomings in the art, improved materials and material systems are needed.

SUMMARY OF THE INVENTION

The present invention addresses the aforementioned needs in the art, as will now be summarized and then further described in detail below.

Some variations provide a low-friction, low-adhesion material comprising:

a durable continuous matrix;

a plurality of first inclusions, dispersed within the matrix, each comprising a low-surface-energy polymer having a surface energy between about 5 mJ/m$^2$ to about 50 mJ/m$^2$; and a plurality of second inclusions, dispersed within the matrix, each comprising a hygroscopic material, wherein the matrix and the first and second inclusions form a lubricating surface layer in the presence of humidity.

In some embodiments, the surface energy of the low-surface-energy polymer is between about 10 mJ/m$^2$ to about 40 mJ/m$^2$.

In some embodiments, the low-surface-energy polymer is a fluoropolymer, such as one selected from the group consisting of polyfluoroethers, perfluoropolyethers, polyfluoroacrylates, polyfluorosiloxanes, polyfluorosilicones, and combinations thereof. In some embodiments, the low-surface-energy polymer is a siloxane.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In some embodiments, the first inclusions and the second inclusions are discrete particles. The discrete particles may be characterized by an average particle size from about 50 nm to about 1 mm, such as from about 1 micron to about 10 microns.

Alternatively, or additionally, the first inclusions and the second inclusions may be covalently connected to each other in a block copolymer comprising the low-surface-energy polymer and the hygroscopic material.

For example, a block copolymer may be a segmented copolymer composition comprising:

(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

In certain embodiments, the segmented copolymer composition includes a copolymer having the structure:

wherein:
$X=CH_2-(CH_2-CH_2-O)_p-OH$ wherein p=0 to 50;
m=1 to 100; and
n=1 to 100.

The durable continuous matrix may comprise a polyurethane network. The polyurethane network may be a linear segmented polyurethane thermoplastic, optionally containing a low-surface-energy species and a hygroscopic species. For example, the low-surface-energy species may be a perfluoropolyether and the hygroscopic species may be poly(ethylene glycol). The polyurethane network may be a crosslinked thermoset, optionally containing a low-surface-energy species and/or a hygroscopic species such as perfluoropolyether and poly(ethylene glycol), respectively. The durable continuous matrix may also comprise an epoxy network.

The material may further include one or more additional components selected from the group consisting of a particulate filler, a pigment, a dye, a plasticizer, a flame retardant, a flattening agent, and a substrate adhesion promoter.

A particulate filler may be selected from the group consisting of silica, alumina, silicates, talc, aluminosilicates, barium sulfate, mica, diatomite, calcium carbonate, calcium sulfate, carbon, wollastonite, and combinations thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Variations of the invention also provide a low-friction, low-adhesion material comprising:

a durable continuous matrix; and a plurality of inclusions, dispersed within the matrix, each comprising a low-surface-energy polymer surrounding a hygroscopic material, wherein the low-surface-energy polymer has a surface energy between about 5 mJ/m² to about 50 mJ/m², wherein the matrix and the inclusions form a lubricating surface layer in the presence of humidity.

In some embodiments, the surface energy of the low-surface-energy polymer is between about 10 mJ/m² to about 40 mJ/m².

In some embodiments, the low-surface-energy polymer is a fluoropolymer, such as one selected from the group consisting of polyfluoroethers, perfluoropolyethers, polyfluoroacrylates, polyfluorosiloxanes, polyfluorosilicones, and combinations thereof. In some embodiments, the low-surface-energy polymer is a siloxane.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The inclusions may discrete particles, such as particles characterized by an average particle size from about 50 nm to about 1 mm. In some embodiments, the inclusions contain a block copolymer comprising the low-surface-energy polymer covalently bonded to the hygroscopic material. For example, a block copolymer may be a segmented copolymer composition comprising:

(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

In some embodiments, the segmented copolymer composition includes a copolymer having the structure:

wherein:
$X=CH_2-(CH_2-CH_2-O)_p-OH$ wherein p=0 to 50;
m=1 to 100; and
n=1 to 100.

The durable continuous matrix may comprise a polyurethane network. The polyurethane network may be a linear segmented polyurethane thermoplastic, optionally containing a low-surface-energy species and a hygroscopic species. For example, the low-surface-energy species may be a perfluoropolyether and the hygroscopic species may be poly(ethylene glycol). The polyurethane network may be a crosslinked thermoset, optionally containing a low-surface-energy species and/or a hygroscopic species such as perfluoropolyether and poly(ethylene glycol), respectively. The durable continuous matrix may also comprise an epoxy network.

The material may further include one or more additional components selected from the group consisting of a particulate filler, a pigment, a dye, a plasticizer, a flame retardant, a flattening agent, and a substrate adhesion promoter.

A particulate filler may be selected from the group consisting of silica, alumina, silicates, talc, aluminosilicates, barium sulfate, mica, diatomite, calcium carbonate, calcium sulfate, carbon, wollastonite, and combinations thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Other variations of the invention provide a precursor material for a low-friction, low-adhesion material, the precursor material comprising:

a hardenable material capable of forming a durable continuous matrix;

a plurality of inclusions, dispersed within the hardenable material, each comprising a hygroscopic material; and a low-surface-energy polymer having a surface energy between about 5 mJ/m$^2$ to about 50 mJ/m$^2$, wherein the low-surface-energy polymer surrounds the hygroscopic material within the inclusions and/or is present as additional inclusions, dispersed within the hardenable material.

In various embodiments, the hardenable material is capable of forming a polyurethane network, a crosslinked thermoset, or an epoxy network.

In some embodiments, the low-surface-energy polymer is a fluoropolymer selected from the group consisting of polyfluoroethers, perfluoropolyethers, polyfluoroacrylates, polyfluorosiloxanes, polyfluorosilicones, and combinations thereof.

The hygroscopic material may be selected from the group consisting of poly(acrylic acid), poly(ethylene glycol), poly (2-hydroxyethyl methacrylate), poly(vinyl imidazole), poly (2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The inclusions (and additional inclusions, when present) may be discrete particles or separate phases of a continuous polymer material, for example. In some embodiments, the precursor material contains a block copolymer comprising the low-surface-energy polymer and the hygroscopic material.

In some precursor materials, a block copolymer is a segmented copolymer composition comprising:

(a) one or more first soft segments selected from fluoropolymers having an average molecular weight from about 500 g/mol to about 10,000 g/mol, wherein the fluoropolymers are ($\alpha,\omega$)-hydroxyl-terminated and/or ($\alpha,\omega$)-amine-terminated;

(b) one or more second soft segments selected from polyesters or polyethers, wherein the polyesters or polyethers are ($\alpha,\omega$)-hydroxyl-terminated and/or ($\alpha,\omega$)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

In some precursor materials, a segmented copolymer composition includes a copolymer having the structure:

wherein:
$X=CH_2-(CH_2-CH_2-O)_p-OH$ wherein p=0 to 50;
m=1 to 100; and
n=1 to 100.

DETAILED DESCRIPTION OF EMBODIMENTS OF THE INVENTION

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique. Also, "between about" and "from about" are used interchangeably.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the invention provide a highly durable surface coating intended to inhibit the formation of ice at sub-0° C. temperatures and reduce the accumulation of dirt and insect debris to a vehicle surface upon impact. A continuous, durable matrix surrounds both low-surface-energy (low-adhesion) material inclusions as well as hygroscopic material inclusions. Such a strategy has the advantage of improved durability based on the choice of matrix material, and potentially simpler processing.

Some variations of this invention are premised on the discovery of a material that possesses both low surface energy (for low adhesion) and the ability to absorb water. A structured material or coating, as disclosed, passively absorbs water from the atmosphere and then expels this water upon impact with the impacting debris, to create a lubrication/self-cleaning layer and reduce the friction and adhesion of the impacting body (such as an insect) on the surface. The material may be used as a coating or as a surface.

Some variations of the invention are also predicated on overcoming mechanical limitations to improve overall system durability. Discrete particles possessing low-adhesion and hygroscopic properties are held together by a durable matrix material. The matrix material may be derived from a curable precursor, typically beginning in a low-viscosity state that allows for the incorporation of discrete particles. This mixture may then be homogenized and applied to a surface in a convenient manner such as spray coating, casting, or screen printing.

The structure or topology of the coating or solid material includes discrete particulates or phases of both low-surface-energy material and hygroscopic material surrounded by a continuous matrix material. The coating in some embodiments may be characterized as "bugphobic," which is intended to mean the coating has relatively low adhesion with an impacting bug. Because these materials trap a layer of water near the surface, they also can delay the formation of ice, in some embodiments.

The lubricating component also has the ability to trap and organize a layer of water at the surface to both inhibit freezing and reduce adhesion forces in ice that does begin to accumulate on the surface. The coating in some embodiments may be characterized as "icephobic," which is intended to mean the coating is capable of delaying the formation of ice and/or causing a freezing-point depression of ice, compared to a bare substrate.

In contrast to prior structures and methods, the disclosed material can absorb water from the air and use this water as a lubricant to wash and remove debris from the surface. The surface contains domains of a low-surface-energy polymer (such as, but not limited to, a fluoropolymer) providing low adhesion, and domains of a hygroscopic material. Without being limited by theory, it is speculated that in some embodiments, the hygroscopic material absorbs water and releases some of it back onto the surface during impact. The atmospheric water is thus captured as a lubricant and is a continually available, renewable resource.

Figure 2:
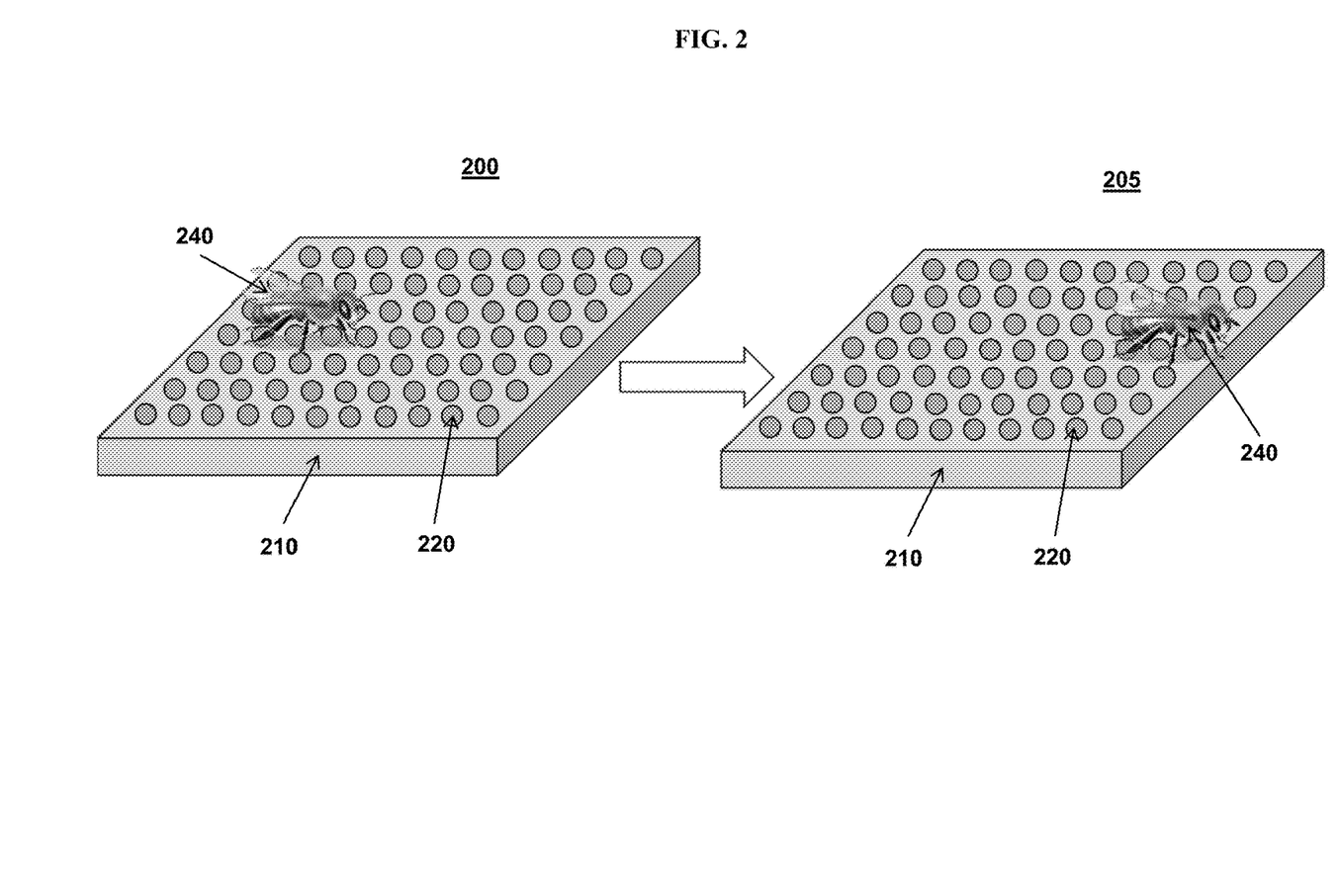
FIG. 2 illustrates the mode of action according to some variations, showing an insect sliding off the surface following impact.

By reducing friction, the debris is less likely to embed in or otherwise attach to the surface and instead will slough off the surface (as illustrated in FIG. 2, where debris is depicted as a wasp).

Debris may be organic or inorganic and may include insects, dirt, dust, soot, ash, pollutants, particulates, ice, seeds, plant or animal fragments, plant or animal waste products, combinations or derivatives of any of the foregoing, and so on.

In some variations, low-friction and low-adhesion structures are created by a heterogeneous microstructure comprising a low-surface-energy polymer that is interspersed with hygroscopic domains (lubricating inclusions). Debris impacting the surface has low adhesion energy with the surface, due to the presence of the low-surface-energy polymer, and the debris will not remain on the surface.

In some variations, the ability of a hygroscopic component to trap and structure water at the surface produces a freezing-point depression effect that helps inhibit ice formation and reduce its adhesion strength upon forming.

High-toughness, durable matrix material can be chosen and optimized primarily for mechanical robustness and to ensure stability of the active particles under aggressive environmental conditions. The matrix material needs to physically survive in demanding environments such as the exterior of a vehicle. Chemically, the matrix material may be formulated to incorporate elements of low-surface-energy material and/or hygroscopic material.

Choice of the low-surface-energy and hygroscopic particles can range over a variety of materials, but some embodiments will be driven by cost and commercial availability as well as performance. Selection of matrix material can also vary widely, with some embodiments requiring a low-viscosity curable precursor and a high degree of robustness upon curing. Commercially polyurethane networks demonstrate excellent levels of durability where they are utilized in many environmentally aggressive environments such as aircraft exterior coatings. The ability of such networks to be formed into highly crosslinked thermoset networks, and exploit additional physical association in the hydrogen bonds found in the urethane backbone, produce exceptionally durable materials.

It can also be advantageous to employ fluoropolymer and hygroscopic elements in the matrix material—in addition to the discrete particles—to maximize anti-fouling and anti-icing performance. This could be accomplished by fabricating a linear segmented copolymer architecture or producing a crosslinked thermoset containing one or both fluoropolymer (or other low-surface-energy material) or hygroscopic elements. In some embodiments, small discrete domains are generated in situ during the curing process, driven by either the phase separation of the precursors themselves with surrounding elements or by the decreased miscibility produced by progressively higher-molecular-weight species created upon curing.

An alternative to a polyurethane matrix is the use of an epoxy matrix material similar to the matrix materials used in carbon composites or glass fiber-reinforced composites. Such networks have the ability to incorporate fluoropolymer and hygroscopic elements as well, with a greater rigidity than in typical urethane coatings.

The low-surface-energy (e.g., fluoropolymer) particles can range between 50 nm to 1 mm in primary particle size, with a preferred size of 1-10 microns. The hygroscopic particles can also range between 50 nm and 1 mm in primary particle size with a preferred size of 1-10 microns. Other particle sizes are possible. The fluorinated and hygroscopic particles may be fully discrete from one another, adjacent to one another (including chemical or physical bonding), or a combination thereof.

Figure 1A:
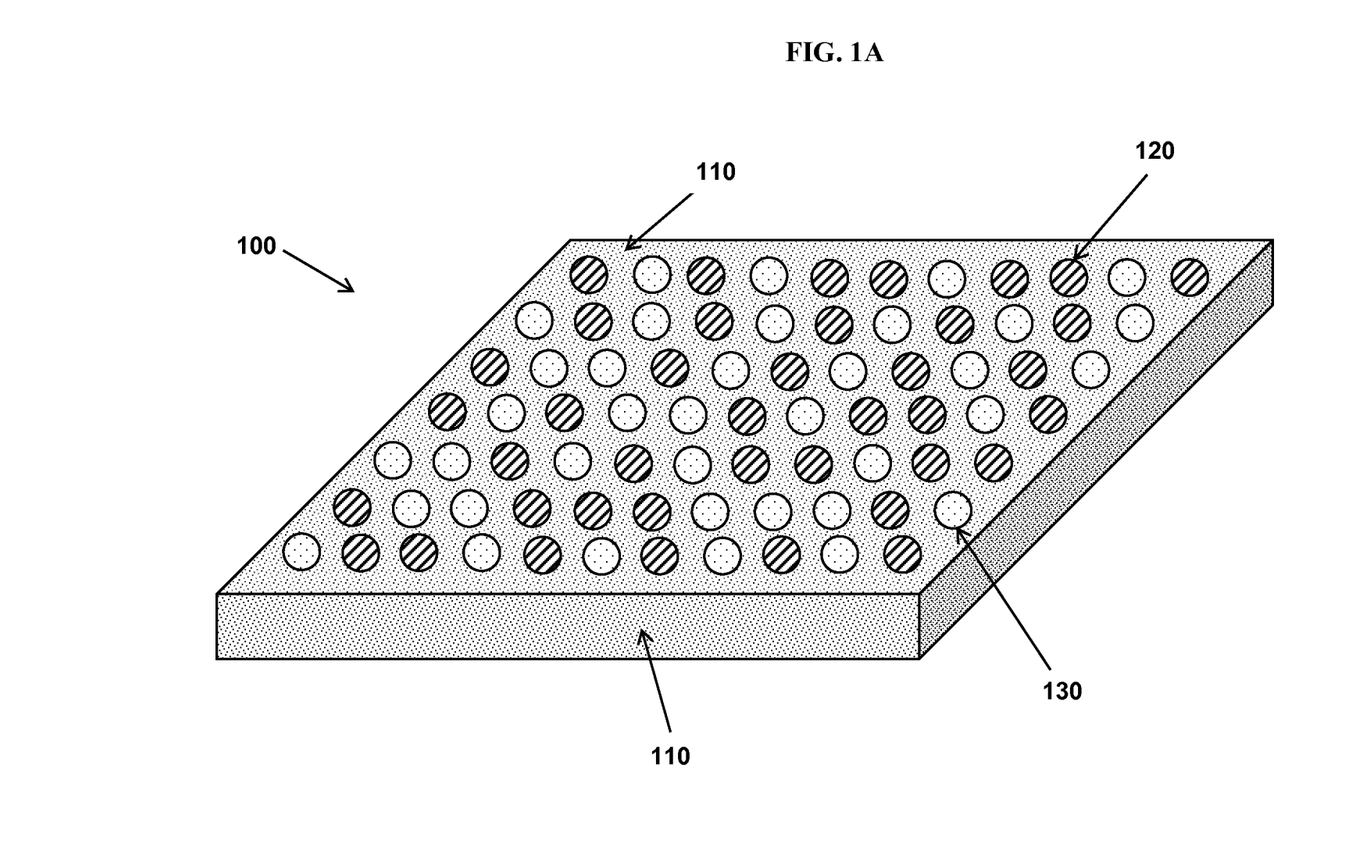
FIG. 1A depicts the structure (three-dimensional view) of some variations of the invention, providing a high-durability, low-friction, low-adhesion material.
Figure 1B:
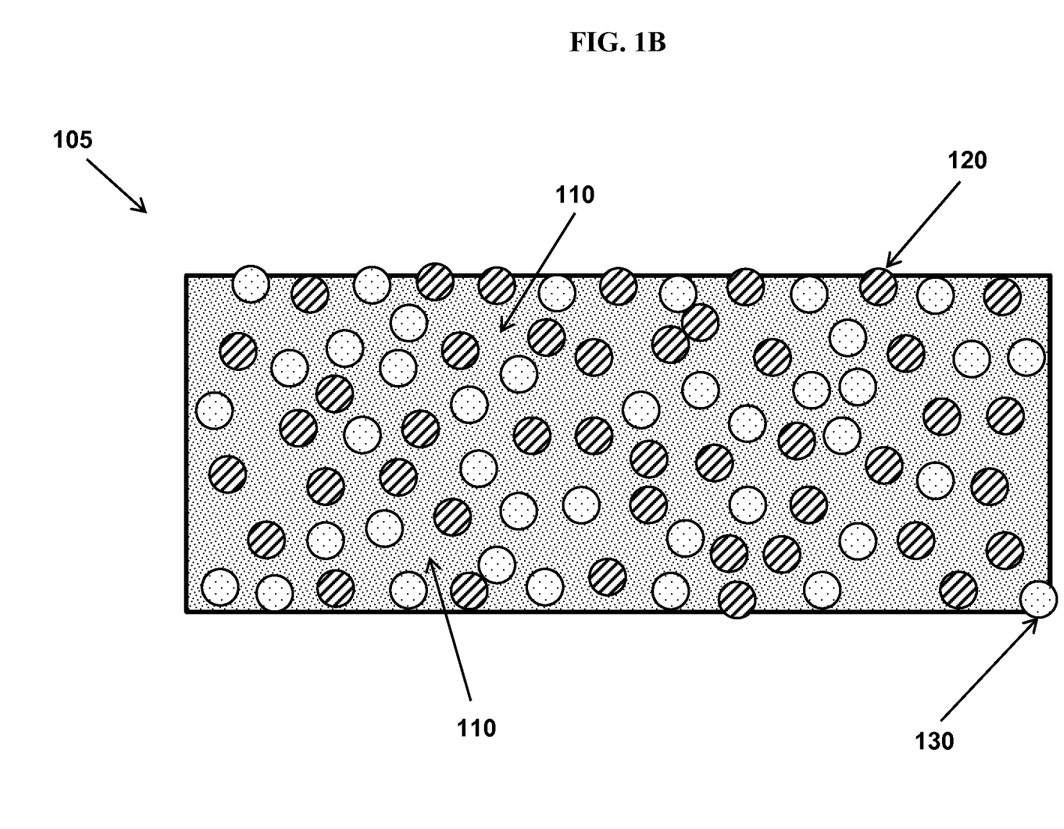
FIG. 1B depicts the structure (cross-sectional view) of some variations of the invention, providing a high-durability, low-friction, low-adhesion material.

The structure of some variations of the invention is shown in FIGS. 1A and 1B, depicting different views of the structure of a coating or surface with low-friction and self-cleaning properties. FIG. 1A is a three-dimensional view, and FIG. 1B is a cross-sectional view of the same structure.

The structure 100 of FIGS. 1A and 1B includes a durable continuous matrix 110. A "durable continuous matrix" means that the matrix material is present in a form that includes strong (stable during conditions of final use) chemical bonds among molecules of the matrix material. An example of such chemical bonds is crosslinks between polymer chains. In a durable continuous matrix 110, there may be present various defects, cracks, broken bonds, impurities, additives, and so on. The structure 100 further includes a plurality of inclusions 120, dispersed within the matrix 110, each of the inclusions 120 comprising a hygroscopic material; and a plurality of inclusions 130, dispersed within the matrix 110, each of the inclusions 130 comprising a low-surface-energy material. The inclusions 120, 130 preferably exist throughout the material, in both planar (FIG. 1A) and depth (FIG. 1B) dimensions. The anti-adhesion function is retained even after abrasion of the top layer of the material.

Optionally, the durable continuous matrix 110 may further comprise one or more additives selected from the group consisting of fillers, colorants, UV absorbers, defoamers, plasticizers, viscosity modifiers, density modifiers, catalysts, and scavengers.

The mode of action according to some variations is shown in FIG. 2. The structure of FIG. 2 includes a durable continuous matrix 210 and a plurality of inclusions 220. FIG. 2 illustrates the response of the surface 200 to an impact of debris, which in this illustration is a bug 240 (e.g, wasp), as a non-limiting example. The bug 240 slides across the surface (200/205) instead of breaking apart, ultimately leaving the surface 205 and thereby not leaving behind debris bound to the material. Note that in FIG. 2, the inclusions 220 represent both inclusions 120 containing a hygroscopic material as well as inclusions 130 containing a low-surface-energy material; or alternatively, inclusions 220 each with low-surface-energy material (shell) surrounding hygroscopic material (core).

Preferred embodiments of these coatings employ fluoropolymers, without limitation of the invention, as described in more detail below. A preferred technique to compatiblize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

In a specific embodiment of the disclosure, there is provided a segmented copolymer composition. The composition comprises one or more $\alpha,\omega$ (alpha, omega)-amine-terminated or $\alpha,\omega$ (alpha, omega)-hydroxyl-terminated fluoropolymer first soft segments having an average molecular weight of between about 500 grams per mole to about 10,000 grams per mole. The exemplary composition further comprises one or more polyethylene glycol second soft segments having an average molecular weight of between about 500 grams per mole to about 10,000 grams per mole. A total content of the one or more first soft segments and the one or more second soft segments is present in an amount of from about 40% by weight to about 90% by weight, based on a total weight percent of the composition. The composition further comprises one or more hard segments present in an amount of from about 15% by weight to about 50% by weight, based on the total weight percent of the composition. The one or more hard segments comprise a combination of one or more isocyanate species and one or more low-molecular-weight polyol or polyamine chain extenders or crosslinkers. Preferred compositions are characterized a contact angle of water on the surface>90° and by a delay in the formation of ice on the surface.

As meant herein, a "low-surface-energy polymer" means a polymer, or a polymer-containing material, with a surface energy of no greater than 50 mJ/m$^2$. The principles of the invention may be applied to low-surface-energy materials with a surface energy of no greater than 50 mJ/m$^2$, in general (i.e., not necessarily limited to polymers).

In some embodiments, the low-surface-energy polymer includes a fluoropolymer, such as (but not limited to) a fluoropolymer produced from monomer(s) selected from the group consisting of fluoroethers, perfluoroethers, fluoroacrylates, fluorosilicones, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of polyfluoroethers, perfluoropolyethers, polyfluoroacrylates, polyfluorosiloxanes, poly(tetrafluoroethylene), and combinations thereof.

Some variations utilize a segmented copolymer composition comprising:

(a) one or more first soft segments selected from fluoropolymers having an average molecular weight from about 500 g/mol to about 10,000 g/mol, wherein the fluoropolymers are $(\alpha,\omega)$-hydroxyl-terminated and/or $(\alpha,\omega)$-amine-terminated;

(b) one or more second soft segments selected from polyesters or polyethers, wherein the polyesters or polyethers are $(\alpha,\omega)$-hydroxyl-terminated and/or $(\alpha,\omega)$-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

It is noted that $(\alpha,\omega)$-terminated polymers are terminated at each end of the polymer. The $\alpha$-termination may be the same or different than the $\omega$-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the molar ratio of the second soft segments to the first soft segments is from about 0.1 to about 1.5. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C═O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N═C═O. For the purposes of this disclosure, S—C(═O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C═O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 3 or greater), i.e. beyond diols or diamines.

At least one polyol or polyamine chain extender or crosslinker may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-buatendiamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

The one or more chain extenders or crosslinkers (or reaction products thereof) may be present in a concentration, in the segmented copolymer composition, from about 0.01 wt % to about 10 wt %, such as about 0.05 wt % to about 1 wt %.

In certain embodiments, the fluoropolymers include a fluoropolymer segmented copolymer with poly(ethylene glycol) having the structure:

wherein:
X=CH$_2$—(CH$_2$—CH$_2$—O)$_p$—OH wherein p=0 to 50;
m=1 to 100; and
n=1 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender or crosslinker may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-buatendiamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

Some variations provide a low-friction, low-adhesion material comprising:
a durable continuous matrix;
a plurality of first inclusions, dispersed within the matrix, each comprising a low-surface-energy polymer having a surface energy between about 5 mJ/m$^2$ to about 50 mJ/m$^2$; and
a plurality of second inclusions, dispersed within the matrix, each comprising a hygroscopic material, wherein the matrix and the first and second inclusions form a lubricating surface layer in the presence of humidity.

Variations of the invention also provide a low-friction, low-adhesion material comprising:

a durable continuous matrix; and a plurality of inclusions, dispersed within the matrix, each comprising a low-surface-energy polymer surrounding a hygroscopic material, wherein the low-surface-energy polymer has a surface energy between about 5 mJ/m$^2$ to about 50 mJ/m$^2$, wherein the matrix and the inclusions form a lubricating surface layer in the presence of humidity.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In some preferred embodiments, the low-surface-energy polymer is a fluoropolymer selected from the group consisting of polyfluoroethers, perfluoropolyethers, polyfluoroacrylates, polyfluorosiloxanes, and combinations thereof.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In certain embodiments, the hygroscopic material is also classified as a hydrophilic material. A hygroscopic substance will actively attract and absorb water. A hydrophilic substance is one where water will preferentially wet the surface, demonstrated by contact angles<90°.

The low-surface-energy polymer and the hygroscopic material are phase-separated, i.e. they do not form a single continuous phase. There may be, but is not necessarily, some degree of chemical and/or physical bonding between the low-surface-energy polymer and the hygroscopic material.

The first and second inclusions are three-dimensional objects or domains, which may be of any shape, geometry, or aspect ratio. In a three-dimensional object, an aspect ratio of exactly 1.0 means that all three characteristic length scales are identical, such as in a perfect cube. The aspect ratio of a perfect sphere is also 1.0. The inclusions may be geometrically symmetric or asymmetric. Randomly shaped asymmetric templates are, generally speaking, geometrically asymmetric. In some embodiments, inclusions are geometrically symmetric. Examples include cylinders, cones, rectangular prisms, pyramids, or three-dimensional stars.

In some embodiments, the inclusions are anisotropic. As meant herein, "anisotropic" inclusions have at least one chemical or physical property that is directionally dependent. When measured along different axes, an anisotropic inclusion will have some variation in a measurable property. The property may be physical (e.g., geometrical) or chemical in nature, or both.

The inclusions may be characterized as templates, domains, or regions (such as phase-separated regions). The inclusions are not a single, continuous framework in the coating. Rather, the inclusions are discrete, non-continuous and dispersed in the durable continuous matrix. The inclusions may be dispersed uniformly within the durable continuous matrix, or randomly (as suggested in FIGS. 1A and 1B). In some low-friction, low-adhesion materials, the low-surface-energy polymer and the hygroscopic material are covalently connected in a block copolymer, in which the inclusions and the continuous matrix are distinct phases of the block copolymer.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in certain embodiments of the invention.

For example, a block copolymer may be a segmented copolymer composition comprising:

(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0, such as from about 0.1 to about 1.5.

In some embodiments, the fluoropolymers include a fluoropolymer having the structure:

wherein:
X=CH$_2$—(CH$_2$—CH$_2$—O)$_p$—OH wherein p=0 to 50;
m=1 to 100; and
n=1 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

A wide range of concentrations of components may be present in the low-friction, low-adhesion material. For example, the durable continuous matrix may be from about 5 wt % to about 95 wt %, such as from about 10 wt % to about 50 wt % of the material. The first and second inclusions may independently be from about 1 wt % to about 90 wt %, such as from about 10 wt % to about 50 wt % of the coating.

Within the inclusions (or region of inclusions) containing the low-surface-energy polymer, the low-surface-energy polymer may be from about 50 wt % to 100 wt %, such as about 60, 70, 80, 90, 95, or 100 wt %. Within the inclusions (or region of inclusions) containing the hygroscopic material, the hygroscopic material may be from about 50 wt % to 100 wt %, such as about 60, 70, 80, 90, 95, or 100 wt %.

The low-surface-energy polymer and/or the hygroscopic material may be surface-treated, such as to adjust hydrophobicity. The low-friction, low-adhesion material optionally further contains one or more additional components selected from the group consisting of a particulate filler, a pigment, a dye, a plasticizer, a flame retardant, a flattening agent, and a substrate adhesion promoter.

The particulate fillers (when present) generally should be in the size range of about 5 nm to about 2 µm, such as about 20 nm to 100 nm. Specific particulate fillers include, for example, silica, alumina, silicates, talc, aluminosilicates, barium sulfate, mica, diatomite, calcium carbonate, calcium sulfate, carbon, wollastonite, and combinations thereof. The particulate fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

In some embodiments, the low-friction, low-adhesion material further includes voids. As intended herein, a "void" is a discrete region of empty space, or space filled with air or another gas, that is enclosed within the durable continuous matrix. The voids may be open (e.g., interconnected voids) or closed (isolated within the continuous matrix), or a combination thereof. The voids may partially surround inclusions.

Various strategies to producing a combination of fluoropolymer (or other low-surface-energy material) and hygroscopic elements in the same material, beyond separate discrete particles in a matrix, include forming discrete particulates of block copolymer materials combining fluoropolymer and hygroscopic elements; using a tough, fluorinated matrix combined with a single hygroscopic discrete particle; or grafting fluoro species onto the surface of discrete hygroscopic particles.

The low-friction, low-adhesion material may be characterized by a water absorption capacity of at least 10 wt % water based on total weight of the low-friction, low-adhesion material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The low-friction, low-adhesion material may be characterized by a surface contact angle of water of greater than 90° (hydrophobic). The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

The material may also be lipophobic or partially lipophobic in some embodiments. In various embodiments, the material is characterized by an effective contact angle of hexadecane (as a measure of lipophobicity) of about 50°, 55°, 60°, 65°, 70°, 75°, 80°, 85°, 90°, or higher.

The material may simultaneously have hydrophobic and lipophobic properties. In certain embodiments, the material is characterized by an effective contact angle of water of at least 90° (such as about 95-100°) and simultaneously an effective contact angle of hexadecane of at least 600 (such as about 65°). In certain embodiments, the material is characterized by an effective contact angle of water of at least 80° (such as about 80-85°) and simultaneously an effective contact angle of hexadecane of at least 70° (such as about 75-80°).

In some embodiments, the material is characterized by a coefficient of friction, measured at 40-55% (e.g. 50%) relative humidity and room temperature, less than 1, 0.9, 0.8, 0.7, 0.6, 0.5, 0.4, or 0.3. In these or other embodiments, the material is characterized by a coefficient of friction, measured at 85% relative humidity and room temperature, less than 0.8, 0.7, 0.6, 0.5, 0.4, 0.3, or 0.2. The low-friction, low-adhesion material may be characterized by a coefficient of friction, measured at 90% relative humidity, less than 0.7.

The coefficient of friction is relatively low due to the presence of a lubricating surface layer. By a "lubricating surface layer in the presence of humidity," it is meant a layer, multiple layers, a partial layer, or an amount of substance that lubricates the substrate such that it has a lower coefficient of friction compared to the substrate without the material present, when in the presence of some amount of atmospheric humidity.

The specific level of humidity is not regarded as critical, but in general may range from about 1% to 100%, typically about 30% to about 70% relative humidity. Relative humidity is the ratio of the water vapor density (mass per unit volume) to the saturation water vapor density. Relative humidity is also approximately the ratio of the actual to the saturation vapor pressure.

The substance that lubricates the substrate is primarily water, but it should be noted that other components may be present in the lubricating surface layer, including oils, metals, dust, dissolved gases, dissolved aqueous components, suspended non-aqueous components, fragments of debris, fragments of polymers, and so on.

The material may be characterized by a delay in the formation of ice on a surface of the material. For example, when a material surface is held at −10° C., the material provided by the invention may be characterized by an average delay in the formation of ice on the surface of at least about 1, 2, 3, 4, 5, 10, 15, 20, 25, 30 minutes, or more.

In various embodiments, the material is a coating and/or is present at a surface of an object or region. The material may be utilized in relatively small applications, such as lens coatings, or for large structures, such as aircraft wings. In principle, the material could be present within a bulk region of an object or part, or could contain a temporary, protective laminating film for storage or transport, which is later removed to adhere to the vehicle, for example.

Other variations of the invention provide a precursor material for a low-friction, low-adhesion material, the precursor material comprising:

a hardenable material capable of forming a durable continuous matrix;

a plurality of inclusions, dispersed within the hardenable material, each comprising a hygroscopic material; and a low-surface-energy polymer having a surface energy between about 5 mJ/m$^2$ to about 50 mJ/m$^2$, wherein the low-surface-energy polymer surrounds the hygroscopic material within the inclusions and/or is present as additional inclusions, dispersed within the hardenable material.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$.

In various embodiments, the hardenable material is capable of forming a polyurethane network, a crosslinked thermoset, or an epoxy network.

In some embodiments, the low-surface-energy polymer is a fluoropolymer selected from the group consisting of polyfluoroethers, perfluoropolyethers, polyfluoroacrylates, polyfluorosiloxanes, polyfluorosilicones, and combinations thereof.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The inclusions (and additional inclusions, when present) may be discrete particles or separate phases of a continuous polymer material, for example. In some embodiments, the precursor material contains a block copolymer comprising the low-surface-energy polymer and the hygroscopic material.

In some precursor materials, a block copolymer is a segmented copolymer composition comprising:

(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

In some precursor materials, a segmented copolymer composition includes a copolymer having the structure:

wherein:
X=CH₂—(CH₂—CH₂—O)$_p$—OH wherein p=0 to 50;
m=1 to 100; and
n=1 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

The low-surface-energy polymer and/or the hygroscopic material may be surface-treated, either prior to introduction into the precursor material or prior to conversion of the precursor material to the low-friction, low-adhesion material.

The precursor material may further contain one or more additional components selected from the group consisting of a particulate filler, a pigment, a dye, a plasticizer, a flame retardant, a flattening agent, and a substrate adhesion promoter. Alternatively, or additionally, such additional components may be introduced during the conversion of the precursor material to the low-friction, low-adhesion material, or to the low-friction, low-adhesion material after it is formed. Specific particulate fillers include, for example, silica, alumina, silicates, talc, aluminosilicates, barium sulfate, mica, diatomite, calcium carbonate, calcium sulfate, carbon, wollastonite, and combinations thereof.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The low-friction, low-adhesion hydrophobic or hydrophilic material, in some embodiments, is formed from a precursor material (or combination of materials) that may be provided, obtained, or fabricated from starting components. The precursor material is capable of hardening or curing in some fashion, to form a durable continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

The low-surface-energy polymer and the hygroscopic material may be in the same phase or in different phases. In some embodiments, the low-surface-energy polymer is in liquid or dissolved form while the hygroscopic material is in dissolved-solid or suspended solid form. In some embodiments, the low-surface-energy polymer is dissolved-solid or suspended-solid form while the hygroscopic material is in liquid or dissolved form. In some embodiments, the low-surface-energy polymer and the hygroscopic material are both in liquid form. In some embodiments, the low-surface-energy polymer and the hygroscopic material are both in dissolved (solvent) form.

Some embodiments of the invention provide a method for fabricating a low-surface-energy and hygroscopic anti-fouling and anti-icing coating, including the steps of:

(a) obtaining a discrete fluoropolymer powder;
(b) obtaining a discrete hygroscopic powder;
(c) mixing both elements from (a) and (b) with a curable polymer resin;
(d) homogenizing all elements from (a), (b), and (c);
(e) applying the homogenized mixture from (d) onto a surface or substrate, by spray coating, casting, screen printing, or another coating means; and
(f) curing or allowing the applied mixture from (e) to cure or harden, thereby providing a low-surface-energy and hygroscopic anti-fouling and anti-icing coating.

In some variations of the invention, a material or coating precursor is applied to a substrate (such as a surface of an automobile or aircraft) and allowed to react, cure, or harden to form a final coating, wherein the material, coating precursor, or final coating contains a segmented copolymer composition comprising:

(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof, wherein the molar ratio of the second soft segments to the first soft segments is less than 2.0.

In some embodiments, the hygroscopic material is also hardenable, either alone or in combination with the low-surface-energy polymer. For instance, a low-surface-energy polymer and a hygroscopic polymer may form a high-molecular-weight block copolymerize and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 μm to about 1 cm or more, such as about 10 μm, 20 μm, 25 μm, 30 μm, 40 μm, 50 μm, 75 μm, 100 μm, 500 μm, 1 mm, 1 cm, or 10 cm. Relatively thick coatings offer good durability and mechanical properties, such as impact resistance, while preferably being relatively lightweight.

The durable continuous matrix offers durability, impact resistance, and abrasion resistance to the coating. There is homogeneity through the z-direction of the film, so that if some portion of the coating is lost (despite the resistance to abrasion), the remainder retains the desired properties. The coating offers a repeating, self-similar structure that allows the coating to be abraded during use while retaining properties. Should the surface be modified due to environmental events or influences, the self-similar nature of the coating allows the freshly exposed surface to present a coating identical to that which was removed.

Vehicle-based cameras for surrounding awareness will require lens coatings that will inhibit soiling in order to function. Once soiled, the camera will lose effectiveness and eventually cease functioning. The coatings/surfaces described herein may be used as camera lens coatings, and may be transparent.

Aircraft lose efficiency from disruption of laminar flow when insect and particulate debris collect on the aircraft wings. This invention provides materials that reduce the adhesion of insect and particulate debris on aircraft surfaces, while simultaneously inhibiting the formation of ice. In the case of ice buildup, the accumulation can develop to the degree of a safety hazard by impeding normal operation of flight control surfaces or allowing solid ice to accumulate near engine intakes where it can enter the turbines. Additionally, buildup on ice on the blades of rotorcraft vehicles is a concern from both a performance and safety standpoint.

Other practical applications for the present invention include, but are not limited to, vehicle windows, optical lenses, filters, instruments, sensors, eyeglasses, cameras, satellites, and weapon systems. For example, automotive applications can utilize these coatings to prevent the formation of ice or debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A material comprising:
   a durable continuous matrix;
   a plurality of first inclusions, dispersed within said matrix, each comprising a fluoropolymer selected from the group consisting of polyfluoroethers, perfluoropolyethers, polyfluoroacrylates, polyfluorosiloxanes, polyfluorosilicones, and combinations thereof, wherein said fluoropolymer has a surface energy between about 5 mJ/m$^2$ to about 50 mJ/m$^2$; and
   a plurality of second inclusions, dispersed within said matrix, each comprising a hygroscopic material that attracts and absorbs water,
   wherein said first inclusions and said second inclusions are discrete particles or phase domains distinct from said durable continuous matrix, and wherein said first inclusions and said second inclusions are covalently connected to each other in a block copolymer comprising said fluoropolymer and said hygroscopic material, wherein said block copolymer is a segmented copolymer composition comprising:

(a) one or more first soft segments containing said fluoropolymer having an average molecular weight from about 500 g/mol to about 10,000 g/mol, wherein said fluoropolymers are $(\alpha,\omega)$-hydroxyl-terminated and/or $(\alpha,\omega)$-amine-terminated;

(b) one or more second soft segments selected from polyesters or polyethers as said hygroscopic material, wherein said polyesters or polyethers are $(\alpha,\omega)$-hydroxyl-terminated and/or $(\alpha,\omega)$-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

2. The material of claim 1, wherein said surface energy of said fluoropolymer is between about 10 mJ/m² to about 40 mJ/m².

3. The material of claim 1, wherein said fluoropolymer is a siloxane.

4. The material of claim 1, wherein said hygroscopic material is selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

5. The material of claim 1, wherein said discrete particles or phase domains are discrete particles that are characterized by an average particle size from about 50 nm to about 1 mm.

6. The material of claim 5, wherein said discrete particles are characterized by an average particle size from about 1 micron to about 10 microns.

7. The material of claim 1,
wherein the molar ratio of said second soft segments to said first soft segments is less than 2.0.

8. The material of claim 7, wherein said segmented copolymer composition includes a copolymer having the structure:

wherein:
X=CH₂—(CH₂—CH₂—O)$_p$—OH wherein p=0 to 50;
m=1 to 100; and
n=1 to 100.

9. The material of claim 1, wherein said matrix comprises a polyurethane network.

10. The material of claim 9, wherein said polyurethane network is a linear segmented polyurethane thermoplastic containing additional low-surface-energy species and additional hygroscopic species.

11. The material of claim 10, wherein said additional low-surface-energy species is perfluoropolyether and said additional hygroscopic species is poly(ethylene glycol).

12. The material of claim 9, wherein said polyurethane network is a crosslinked thermoset containing additional low-surface-energy species and/or additional hygroscopic species.

13. The material of claim 12, wherein said additional low-surface-energy species is perfluoropolyether and said additional hygroscopic species is poly(ethylene glycol).

14. The material of claim 1, wherein said matrix comprises an epoxy network.

15. The material of claim 1, said material further comprising one or more additional components selected from the group consisting of a particulate filler, a pigment, a dye, a plasticizer, a flame retardant, a flattening agent, and a substrate adhesion promoter.

16. The material of claim 15, wherein said particulate filler is selected from the group consisting of silica, alumina, silicates, talc, aluminosilicates, barium sulfate, mica, diatomite, calcium carbonate, calcium sulfate, carbon, wollastonite, and combinations thereof, and wherein said particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

17. A material comprising:
a durable continuous matrix; and
a plurality of inclusions, dispersed within said matrix, each comprising a fluoropolymer surrounding a hygroscopic material that attracts and absorbs water, wherein said fluoropolymer is selected from the group consisting of polyfluoroethers, perfluoropolyethers, polyfluoroacrylates, polyfluorosiloxanes, polyfluorosilicones, and combinations thereof, and wherein said fluoropolymer has a surface energy between about 5 mJ/m² to about 50 mJ/m², and
wherein said inclusions are discrete particles distinct from said durable continuous matrix, and
wherein said inclusions contain a block copolymer comprising said low-surface-energy polymer covalently bonded to, and phase-separated with, said hygroscopic material, wherein said block copolymer is a segmented copolymer composition comprising:

(a) one or more first soft segments containing said fluoropolymer having an average molecular weight from about 500 g/mol to about 10,000 g/mol, wherein said fluoropolymers are $(\alpha,\omega)$-hydroxyl-terminated and/or $(\alpha,\omega)$-amine-terminated;

(b) one or more second soft segments selected from polyesters or polyethers as said hygroscopic material, wherein said polyesters or polyethers are $(\alpha,\omega)$-hydroxyl-terminated and/or $(\alpha,\omega)$-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

18. The material of claim 17, wherein said surface energy of said fluoropolymer is between about 10 mJ/m² to about 40 mJ/m².

19. The material of claim 17, wherein said fluoropolymer is a siloxane.

20. The material of claim 17, wherein said hygroscopic material is selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

21. The material of claim 17, wherein said discrete particles are characterized by an average particle size from about 50 nm to about 1 mm.

22. The material of claim 17,
wherein the molar ratio of said second soft segments to said first soft segments is less than 2.0.

23. The material of claim 22, wherein said segmented copolymer composition includes a copolymer having the structure:

wherein:
X=CH$_2$—(CH$_2$—CH$_2$—O)$_p$—OH wherein p=0 to 50;
m=1 to 100; and
n=1 to 100.

24. The material of claim 16, wherein said matrix comprises a polyurethane network.

25. The material of claim 24, wherein said polyurethane network is a linear segmented polyurethane thermoplastic that contains additional low-surface-energy species and additional hygroscopic species.

26. The material of claim 25, wherein said additional low-surface-energy species is perfluoropolyether and said additional hygroscopic species is poly(ethylene glycol).

27. The material of claim 24, wherein said polyurethane network is a crosslinked thermoset that contains additional low-surface-energy species and/or additional hygroscopic species.

28. The material of claim 27, wherein said additional low-surface-energy species is perfluoropolyether and said additional hygroscopic species is poly(ethylene glycol).

29. The material of claim 16, wherein said matrix comprises an epoxy network.

30. The material of claim 16, said material further comprising one or more additional components selected from the group consisting of a particulate filler, a pigment, a dye, a plasticizer, a flame retardant, a flattening agent, and a substrate adhesion promoter.

31. The material of claim 30, wherein said particulate filler is selected from the group consisting of silica, alumina, silicates, talc, aluminosilicates, barium sulfate, mica, diatomite, calcium carbonate, calcium sulfate, carbon, wollastonite, and combinations thereof, and wherein said particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

* * * * *